United States Patent [19]

Yee et al.

[11] Patent Number: 4,870,119
[45] Date of Patent: Sep. 26, 1989

[54] WATER-SOLUBLE POLYAMIDES CONTAINING AROMATIC GROUPS

[75] Inventors: Benjamin K. C. Yee, Randolph; William L. Younan, Stanhope, both of N.J.

[73] Assignee: Sandoz Ltd., Basel, Switzerland

[21] Appl. No.: 934,275

[22] Filed: Nov. 24, 1986

[51] Int. Cl.$^4$ .................... C08L 63/00; C08L 77/06
[52] U.S. Cl. .................... 523/417; 524/607; 524/608
[58] Field of Search ............ 524/608, 607; 523/417

[56] References Cited

U.S. PATENT DOCUMENTS

| | | | |
|---|---|---|---|
| 3,145,195 | 8/1964 | Tsou | 524/608 |
| 3,240,761 | 3/1966 | Keim | 524/608 |
| 3,311,594 | 3/1967 | Earle | 524/608 |
| 3,329,657 | 7/1967 | Strazdins et al. | 260/78 |
| 3,632,559 | 1/1972 | Matter | 524/608 |
| 3,880,792 | 4/1975 | Faessinger | 524/608 |
| 4,073,788 | 2/1978 | Peterson | 524/608 |
| 4,319,019 | 3/1982 | Lehman | 524/608 |
| 4,407,994 | 10/1983 | Bankert | 524/608 |

FOREIGN PATENT DOCUMENTS

| | | | |
|---|---|---|---|
| 557649 | 5/1958 | Canada | 524/608 |
| 49-16792 | 4/1974 | Japan | 524/607 |
| 51-72506 | 6/1976 | Japan | 524/608 |

*Primary Examiner*—C. Warren Ivy
*Attorney, Agent, or Firm*—Gerald D. Sharkin; Richard E. Vila; Thomas C. Doyle

[57] ABSTRACT

Water-soluble cross-linked polyamides are produced by reacting (B) a cross-linking agent with (A) the product of reacting (A$_1$) a dicarboxylic acid and (A$_2$) a polyamine, provided that at least one of (A$_1$) (A$_2$) and (B) contains an aromatic moiety or that the product of reacting (B) with (A) is further reacted with a compound containing an aromatic moiety. The products are useful as binders for aqueous printing inks.

29 Claims, No Drawings

WATER-SOLUBLE POLYAMIDES CONTAINING AROMATIC GROUPS

This invention relates to the production of water-soluble polyamides, to the novel polyamides so produced and to their use as binders for printing inks.

It is known from U.S. Pat. No. 3,632,559, the entire disclosure of which is incorporated herein by reference, to produce cationically active, water-soluble polyamides by reacting (1) the reaction product of an aliphatic dicarboxylic acid and a polyalkylene polyamine with (2) a bifunctional alkylating or cross-linking agent obtained by the reaction of epichlorohydrin with a secondary or bis-tertiary aliphatic amine. The polyamides so produced are useful as drainage aids, retention agents and/or flotation agents in the manufacture of paper and cardboard. Another important use of these products has been as binders is printing inks. However, this last use has been somewhat limited by the fact that some printing inks containing the polyamides as binder have been found to have insufficient bleedfastness.

We have discovered that the aforementioned problem can be overcome by modifying the polyamides of U.S. Pat. No. 3,632,559 to include in the molecule at least one aromatic moiety.

Accordingly, the present invention provides a process of producing a water-soluble cross-linked polyamide which comprises reacting (A) the product of reacting ($A_1$) a dicarboxylic acid with ($A_2$) a polyamine with (B) a cross-linking agent, which process is characterized in that at least one of reactants ($A_1$), ($A_2$) and (B) contains an aromatic moiety or in that the product of reacting (A) with (B) is further reacted with a compound containing an aromatic moiety.

Preferably the aromatic moiety contains up to 18 ring carbon atoms. It may contain non-aromatic substitution, e.g. up to 4, preferably up to 2 alkyl groups of up to 4, especially 1 or 2 carbon atoms. More preferably, it is unsubstituted phenylene, diphenylene or naphthylene, most preferably phenylene.

The present invention further provides novel water-soluble polyamides produced by the aforementioned process and aqueous printing inks containing such polyamides as binder.

According to one embodiment of the present invention, a water-soluble cationically active polyamide, which may be any of those producible according to the disclosure of U.S. Pat. No. 3,632,559, is reacted with an aromatic moiety-containing compound. It is believed that the aromatic compound reacts with those —NH— groups of the polyamide portion of the molecule which have not reacted with the cross-linking agent, e.g., the —NH—groups of the formula in column 5 of said patent. Suitable aromatic compounds include aralkyl halides of 7 to 16 carbon atoms, particularly benzyl chloride. The cationically active polyamide with which the aromatic compound is reacted is preferably derived from adipic acid, diethylenetriamine and/or triethylenetetramine, and a compound of formula II as defined in U.S. Pat. No. 3,632,559, particularly the Examples thereof. The amount of aromatic compound reacted with the polyamide can vary depending on the properties desired in the final product. The aromatic groups may lower the water-solubility of the product. However, this can be compensated for by N-alkylation to increase the cationic charge density. It is within the skill of the art to determine how many aromatic moieties should be incorporated therein to give the desired balance of properties, e.g., dye compatibility and water-solubility. Typically, 0.0001 to 0.01 mol of aromatic compound may be reacted with each 100 grams of cationically active water-soluble polyamide. The reaction may be effected at a temperature of 20° to 80° C. in an aqueous medium.

According to another embodiment of the invention, the process of U.S. Pat. No. 3,632,559 is modified by substituting for at least part of teh bifunctional cross-linking agent of formula (II) of that patent a bifunctional cross-linking agent containing at least one aromatic moiety, e.g., a compound of the formula (IIa)

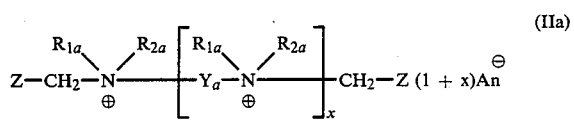

wherein:
x is zero or a whole number up to 7,
Z is selected from

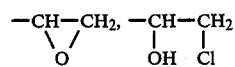

and

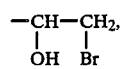

each of
$R_{1a}$ and $R_{2a}$ is selected from $C_{1-4}$alkyl, $C_{1-4}$hydroxyalkyl and $C_{7-13}$aralkyl, e.g. benzyl,
$Y_a$ is selected from $C_{2-6}$alkylene, 2-hydroxy-1,3-propylene, phenylene and radicals of the formula Q—NH—CO—NH—Q, wherein each Q, independently, is —CH$_2$—CH$_2$—, —CH$_2$—CH$_2$—CH$_2$— or $C_{6-12}$arylene, e.g. phenylene, provided that at least one of $R_{1a}$, $R_{2a}$, and Q contains an aromatic moiety, and
An$^\ominus$ is an anion, e.g. chloride,
or a compound such as 3,3,4,4'-benzophenone tetracarboxylic acid dianhydride (commercially available as Gulf-BTDA) or 1,4-bis(chloromethyl)benzene.

The reaction between the polyamide and the aromatic moiety-containing bifunctional cross-linking agent is effected under conditions analogous to those described in U.S. Pat. No. 3,632,559 for the reaction of the polyamide and the compound of formula (II).

The compounds of formula (IIa) may be prepared by processes analogous to those described in U.S. Pat. No. 3,632,559 for making compounds of formula (II).

A preferred embodiment of the invention comprises reacting a compound of formula (II) of U.S. Pat. No. 3,632,559 with an aromatic moiety-containing polyamide produced by the reaction of a dicarboxylic acid or functional derivative thereof with a polyamine, wherein the dicarboxylic acid or the polyamine or both contain an aromatic moiety.

According to one aspect of this preferred embodiment, the polyamide is a product of reacting a compound of formula (I)

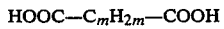

wherein m is an integer 2 to 8, preferably 4 to 8, or a functional derivative thereof, with a polyamine containing two primary amino radicals, at least one secondary amino radical and at least one arylene radical, e.g., a compound of formula (III).

$$H_2N+R_3-NH\overline{)_S}R_4-NH_2 \quad (III)$$

wherein
$R_3$, or each $R_3$ independently when s is greater than 1, is arylene, especially phenylene or mono- or di-($C_{1-4}$alkyl)phenylene, or $C_{1-4}$alkylene,
$R_4$ has one of the significances of $R_3$ independently of $R_3$ and
s is an integer 1 to 5, provided that $R_4$ and/or at least one of $R_3$ is arylene.

Preferably, the polyamine:dicarboxylic acid mol ratio is in the range of 0.85:1 to 1.2:1.

Compounds of formula (III) are known or can be produced from known material by conventional procedures.

A more preferred process for producing aromatic moiety-containing polyamides according to the present invention comprises modifying the process of U.S. Pat. No. 3,632,559 by substituting an aromatic group-containing dicarboxylic acid for at least part of the aliphatic dicarboxylic acid of formula (I) above.

Thus, the more preferred process of this invention comprises reacting a compound of formula (II) defined in U.S. Pat. No. 3,632,559 with the product of reacting ($A_1'$) an aromatic dicarboxylic acid of formula (Ia)

$$HOOC-Ar-COOH \quad (Ia)$$

wherein Ar is substituted or unsubstituted arylene, and ($A_2'$) a polyalkylene polyamine containing two primary amino radicals, at least one secondary amino radical and at least two alkylene radicals.

In formula (Ia) Ar preferably contains 6 to 16 carbon atoms, including any substitution. More preferably, Ar is phenylene, diphenylene or naphthylene and is unsubstituted or substituted by one or two $C_{1-2}$alkyl groups.

It is intended that the compounds of formula (Ia) include functional derivatives of the acids, such as the corresponding anhydrides, chlorides and esters, e.g., methyl esters.

Particularly preferred compounds of formula (Ia) are phthalic acid, isophthalic acid, terephthalic acid and their anhydrides, more particularly phthalic acid and phthalic anhydride.

Reactant ($A_2'$) above is preferably a compound of formula (VI) disclosed in U.S. Pat. No. 3,632,559, more preferably diethylenetriamine, triethylenetetramine, tetraethylenepentamine, tri-(1,2-propylene)-tetramine, di-(1,3-propylene)-triamine and di-(1,4-butylene)-triamine, most preferably triethylenetetramine or diethylenetriamine, particularly the latter.

The compound of formula (II) is preferably a product of reacting a secondary or bis-tertiary amine of formula (VIII) or (IX) or a salt, e.g. sulfate or hydrochloride, thereof, as disclosed in U.S. Pat. No. 3,632,559, with epichlorohydrin. More preferably, it is the product of reacting dimethylamine, hydrochloric acid and epichlorohydrin in a mol ratio of about 2:1:3 in aqueous medium.

In more preferred process described above reactant ($A_1'$) is more preferably a mixture of a compound of formula (Ia) and an aliphatic dicarboxylic acid of formula (I) above or a functional derivative, e.g. anhydride, chloride or ester, thereof.

The most preferred compound of formula (I) is adipic acid.

More than one compound of formula (I) and/or formula (Ia) may be present and the mol ratios may vary depending on the nature of the respective aromatic and aliphatic moieties. Especially preferred are mixtures in which the mol ratio of compound of formula (Ia) to compound of formula (I) is in the range of 6:4 to 1:50, more especially 1:1 to 1:20, most especially 1:4 to 1:15, particularly 1:6 to 1:9.

Reactants ($A_1'$) and ($A_2'$) are preferably reacted in a mol ratio polyamine:dicarboxylic acid in the range 0.85:1 to 1.2:1, more preferably 0.95:1 to 1.1:1 at elevated temperature, preferably 100°-200° C., more preferably 150°-185° C. The product of this reaction will be referred to hereinafter as the "polyamide intermediate".

According to the preferred process of this invention the modified cationically active water-soluble polyamide product is produced by reacting a polyamide intermediate, prepared as disclosed above, with a compound of formula (II) in the manner disclosed in U.S. Pat. No. 3,632,559, particularly at column 5, line 1 to column 6, line 39 and column 8, line 40 to column 9, line 47. It is important that alkylation should be exhaustive, i.e. that all epoxy or halogenohydrin groups Z in the crosslinking agent capable of effecting alkylation be reacted. The proportions of reactants should be selected so as to give a cross-linked product which is water-soluble to an extent of at least 10 grams per liter of distilled water. Preferably, such a solution will remain clear and homogeneous for 2 hours at 90° C. at pH 8–9. Products produced according to the most preferred process of the invention have a solubility in water of at least 10%, preferably at least 30%, at 20° C. Preferably they have a viscosity in the range 340–450, more preferably 370–420 cps at 20° C. using a Brookfield Viscometer Model RVT with a No. 4 spindle at 50 rpm.

With the preferred reactants suitable weight ratios of polyamide to compound of formula (II) are in the range of 2:1 to 3:1 preferably about 2.5:1 to 2.9:1, particularly 2.5:1. The preferred mol ratios are in the range of about 4:1 to 5:1.

The water-solubility of the product can be controlled not only by the selection of appropriate starting materials and proportions thereof, but also by adjusting the cationic charge density, if desired, by additional N-alkylation with methyl chloride or another alkylating agent.

The pH of the product is generally in the range 6.0 to 9.5, preferably 6.5 to 8.5. It is usually obtained as such, but can be adjusted, if necessary, in known manner.

The products which are produced according to the preferred process of this invention and which are also a part of the invention are of a complex nature. Essentially, they differ from the products according to U.S. Pat. No. 3,632,559 by virtue of their containing aromatic moieties in place of some of the alkylene moieties in the polyamide portions of the molecule. Thus, the products produced according to the preferred process are believed to have a structure comprising repeating units corresponding to the formula at column 5 of U.S. Pat. No. 3,632,559 but containing arylene, especially phenylene, groups in place of some of the —CH$_2$—CH$_2$— or —(CH$_2$)$_4$ groups, particularly the latter, in said formula.

A further aspect of this invention comprises an aqueous printing ink containing, as binder, a water-soluble cross-linked polyamide produced as disclosed above.

Aqueous printing inks are well known in the art and comprise a colorant, a binder and water. Other adjuvants which may be present include pH control agents, lubricants, foam suppressants and water-miscible or water-soluble organic solvents.

The amount of polyamide employed in the inks of this invention is preferably in the range 1.5 to 7%, by weight, more preferably 2.5 to 5%. The amounts are based on the active material, the polyamides normally being employed in the form of aqueous solutions.

The colorant may be a pigment or a water-soluble dyestuff, such as a direct, acid, fiber-reactive or sulfur dyestuff. The polyamides of the present invention are particularly advantageous with water-soluble dyestuffs containing aromatic groups, especially direct dyestuffs. All of the aforementioned types of dyestuffs are well known in the art and are individually treated in the Colour Index. Representative of such dyes are C.I. Direct Red 239, C.I. Direct Red 253, C.I. Direct Yellow 35, C.I. Direct Yellow 107, C.I. Direct Yellow 132, C.I. Direct Yellow 133, C.I. Direct Yellow 150 and C.I. Direct Blue 267.

The pH of the printing ink is preferably in the range 8.5–11, more preferably 9–10.5. A pH control agent, such as an alkanolamine, e.g. ethanolamine, may be included.

Preferably, the printing ink also contains a lubricant, which inhibits build-up of the ink on the printing equipment. Polyhydric alcohols, such as glycerin, are conventionally used for this purpose. The amount of such lubricant is generally about 2 to 20% by weight of the printing ink, preferably about 5 to 15%, especially 6 to 10%.

In addition to the polyamide, the printing ink may contain additional materials which act as binders, such as resins derived from rosin or other materials well known for this purpose.

Other materials which may be present include water-soluble or -miscible organic solvents such as glycol ethers, e.g. butyl cellosolve.

Suitable inks may be prepared by substituting a water-soluble cross-linked polyamide of this invention for part or all of the cationic polyamide amine in inks prepared according to U.S. Pat. No. 4,108,812, the entire disclosure of which is incorporated herein by reference.

The aqueous printing inks of the present invention are especially useful for the printing of paper, particularly tissue, toweling and napkins and give printings which are characterized by improved water bleedfastness. They are particularly advantageous when used on paper produced from furnishes which sometimes present problems of bleedfastness, e.g., tissue furnishes containing hardwood treated by a neutral sulfite process, such as Permachem pulp.

Printing with the inks of this invention can be effected by conventional techniques, such as flexographic printing.

This invention will be illustrated by the following examples in which parts and percentages are by weight unless otherwise indicated and temperatures are in Centigrade degrees.

EXAMPLE I

A. Production of Polyamide

To a 1 liter 3-necked flask equipped with mechanical stirrer, thermometer, reflux condenser, addition funnel and means of providing $N_2$ atmosphere, is charged 149.6 g (1.45 mol) of diethylenetriamine and 54.5 g (3.03 mol) of water. To the stirred mixture, a solid mixture of 180.0 g (1.23 mol) of adipic acid and 20.3 g (0.137 mol) of phthalic anhydride is added in portions over a period of 15 min. at 55°–75° C. After the addition, the reaction mixture is stirred and heated under $N_2$ atmosphere over a period of 4 hrs. from 75° C. to 170°–175° C. The reaction mixture is stirred and heated at 170°–175° C. for an additional 3 hours. 104.1 g of water is collected via distillation during the heating period. About 46.5 g of water is added dropwise to the reaction mixture over a period of 1 hour while the temperature drops from 170° to 95° C. The mixture is heated for an additional half hour at 90°–100° C. and cooled to room temperature, resulting in 751.3 g of 40% solution. At room temperature 250 g of water is added to give a 30% solution of the polyamide in the form of a clear red liquid.

B. Preparation of Cross-linking Agent

To a 1 liter 3-necked flask equipped with mechanical stirrer, reflux condenser and addition funnel, is charged 294.0 g (16.3 mol) of water and 166.5 g (1.48 mol.) of 40% aqueous dimethylamine solution. About 75 g (0.75 mol) of 36.5% hydrochloric acid is added dropwise at 35° C. to the amine solution. The reaction temperature is maintained with external cooling. 205.5 g (2.20 mol) of epichlorohydrin is added dropwise over a period of 2½ hrs. at 25°–37° C. After the addition, the reaction mixture is stirred and heated at 37° C. for 6 hrs. and then cooled to room temperature, resulting in 738 g of 40% solution of the cross-linking agent. At room temperature 246 g water is added to give a 30% solution as a clear light yellow liquid.

C. Preparation of Cross-linked Polyamide

To a 250 ml 3-necked flask equipped with mechanical stirrer, reflux condenser, and thermometer, are charged 100 g (0.139 mol) of the 30% solution obtained in Step 1A above and 39 g (0.029 mol) of the 30% solution obtained in Step 1B above. The reaction mixture is stirred and heated for 7 hrs. at 65° C. and cooled to room temperature. The resulting product is a clear red liquid having a viscosity of 385 cps measured at 20° C. with a Brookfield Viscometer, Model RVT using a No. 4 spindle at 50 rpm.

EXAMPLE 2

Step C of Example 1 is repeated using 40 g (0.03 mol) of the 30% solution obtained according to Step 1B. A clear red liquid having a viscosity of 400 cps. is obtained.

EXAMPLE 3

A. Preparation of Polyamide

The procedure of Step A of Example 1 is repeated, except that 23.26 g terephthalic acid is used in place of the 20.3 g phthalic anhydride and the 40% solution of reaction product is not diluted.

B. Preparation of Cross-linking Agent

The procedure of Step B of Example 1 is repeated, except that the final dilution to 30% is omitted.

C. Preparation of Cross-linked Polyamide

To a 250 ml 3-necked flask equipped with a mechanical stirrer, reflux condenser and thermometer are charged 100 g of the product of Step 3A, 26 g of the product of Step 3B and 45.3 g water. The reaction mixture is stirred and heated for 7 hours to 65° C. and cooled to room temperature to yield a 30% solution.

PRINTING INKS

A red and a green printing ink are prepared by mixing the following components in the specified amounts (parts by weight):

|  | Red | Green |
|---|---|---|
| Product of Example 1 | 15.0 | 15.0 |
| Glycerine-containing lubricant | 8.3 | 9.0 |
| Carta Yellow R.W. Liquid | 0.7 | 3.6 |
| Carta Brilliant Blue PTS Liq. | — | 7.9 |
| Cartasol Red 2GF Liq. | 12.0 | 0.4 |
| Print base (butyl cellosolve 46%; ethanolamine 16%; rosin derived polymer 11%; foam suppressant 0.1%; water to 100%) | 15.0 | 15.0 |
| Water | 49.0 | 49.1 |

These printing inks have superior bleedfastness to water compared to otherwise identical printing inks containing, instead of the product of Example 1, the corresponding product produced using adipic acid as sole dicarboxylic acid.

We claim:

1. An aqueous printing ink comprising a colorant and, as binder, a cross-linked polyamide produced by reacting (A) the product of reacting (A$_1$) a dicarboxylic acid or an anhydride, chloride or ester thereof and (A$_2$) a polyamine with (B) a cross-linking agent of the formula II

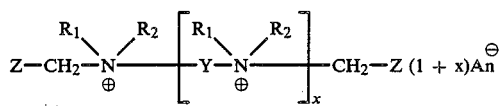

wherein:
x is zero or a whole number up to 7,
Z is selected from

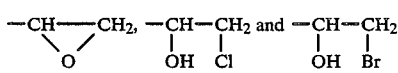

each of R$_1$ and R$_2$ is selected from C$_{1-4}$alkyl and C$_{1-4}$-hydroxyalkyl radicals,
Y is selected from alkylene radicals with from 2 to 6 carbon atoms, 2-hydroxy-1,3-propylene and the radicals

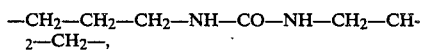

and
An$^\ominus$ is an anion,
with the provisos that
(i) the mol ratio of (A):(B) is such that a product is obtained which is soluble in distilled water to an extent of at least 10% at 20° C.
(ii) the reaction of (A) with (B) is carried out until all of the groups Z are reacted, and either
(iii) at least one of (A$_1$) and (A$_2$) contains an arylene radical selected from phenylene, diphenylene and naphthylene groups which are unsubstituted or substituted by up to four C$_{1-4}$alkyl groups or
(iv) the product of reacting (A) with (B) is further reacted with an aralkyl halide containing 7 to 16 carbon atoms.

2. A printing ink according to claim 1 wherein at least one of (A$_1$) and (A$_2$) contains an arylene radical.

3. A printing ink according to claim 2 wherein the binder is a product of reacting (A') the product of reacting (A$_1$) a compound of formula (I)

where m is an integer 2 to 8,
with (A$_2$) a polyamine containing two primary amino groups, at least one secondary amino group and at least one arylene radical, with (B') a compound of formula (II)

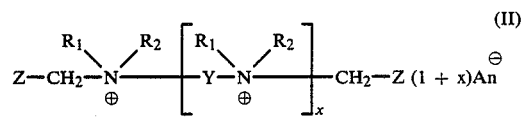

wherein:
x is zero or a whole number up to 7,
Z is selected from

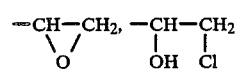

and

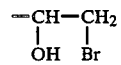

each of R$_1$ and R$_2$ is selected from C$_{1-4}$alkyl and C$_{1-4}$-hydroxyalkyl radicals,
Y is selected from alkylene radicals with from 2 to 6 carbon atoms, 2-hydroxy-1,3-propylene, and the radicals

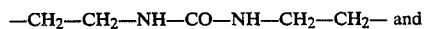

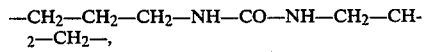

and

An$^\ominus$ is an anion.

4. A printing ink according to claim 2 wherein the binder is a product of reacting (A'') a product of reacting (A'$_1$) a compound of formula (Ia)

wherein Ar is an arylene radical or an anhydride, chloride or ester thereof or a mixture of a compound of formula (Ia) and a compound of formula (I)

wherein m is an integer 2 to 8 or an anhydride, chloride or ester thereof with (A'$_2$) a polyalkylene polyamine containing two primary amino radicals, at least one secondary amino radical and at least two alkylene radicals
with (B') a compound of formula (II)

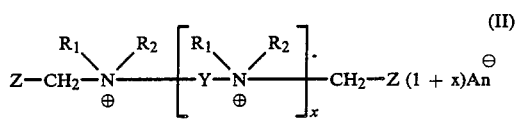 (II)

wherein:
x is zero or a whole number up to 7,
Z is selected from

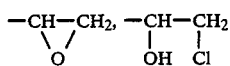

and

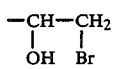

each of $R_1$ and $R_2$ is selected from $C_{1-4}$alkyl and $C_{1-4}$-hydroxyalkyl radicals,
Y is selected from alkylene radicals with from 2 to 6 carbon atoms, 2-hydroxy-1,3-propylene, and the radicals —$CH_2$—$CH_2$—NH—CO—NH—$CH_2$—$CH_2$— and

—$CH_2$—$CH_2$—$CH_2$—NH—CO—NH—$CH_2$—$CH_2$—$CH_2$—, and $An^\ominus$ is an anion.

5. A printing ink according to claim 4 wherein $(A'_1)$ is a mixture of a compound of formula (Ia) or an anhydride, chloride or ester thereof and a compound of formula (I)

HOOC—$C_mH_{2m}$—COOH (I), wherein
m is an integer 2 to 8,
or an anhydride, chloride or ester thereof.

6. A printing ink according to claim 5 wherein the compound of formula (Ia) is selected from phthalic acid, isophthalic acid, terephthalic acid and their anhydrides and mixtures thereof and, in the compound of formula (I), m is an integer 4 to 8.

7. A printing ink according to claim 6 wherein the compound of formula I is adipic acid.

8. A printing ink according to claim 7 wherein the compound of formula (Ia) is phthalic acid or phthalic anhydride.

9. A printing ink according to claim 5 wherein reactant $(A'_2)$ is a compound of formula (VI)

$H_2N$—$C_pH_{2p}$(NH—$C_pH_{2p}$)$_q$$NH_2$ (VI)

wherein
p is an integer 2 to 4 and
q is an integer 1 to 4,
or a mixture thereof.

10. A printing ink according to claim 4 wherein the compound of formula II is a product of reacting a compound of formula (VIII) or (IX) or a salt thereof $R_1$—NH—$R_2$ (VIII)

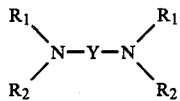 (IX)

wherein $R_1$, $R_2$ and Y are defined in claim 4, with epichlorohydrin.

11. A printing ink according to claim 9 wherein the compound of formula (II) is a product of reacting dimethylamine with epichlorohydrin.

12. A printing ink according to claim 9, wherein the compound of formula II is a product of reacting dimethylamine, hydrochloric acid and epichlorohydrin in an aqueous medium.

13. A printing ink according to claim 12 wherein $(A'_1)$ is a mixture of phthalic anhydride and adipic acid and $(A'_2)$ is diethylenetriamine.

14. A printing ink according to claim 13 wherein the mol ratio of phthalic anhydride to adipic acid is in the range of 1:1 to 1:20.

15. A printing ink according to claim 14 wherein the mol ratio of phthalic anhydride to adipic acid is in the range 1:6 to 1:9 and the mol ratio of dimethylamine to hydrochloric acid is epichlorohydrin is about 2:1:3.

16. A printing ink according to claim 1 wherein, neither $(A_1)$ nor $(A_2)$ contains an arylene radical and the product of reacting (A) with (B) is further reacted with benzyl chloride.

17. A printing ink according to claim 3 wherein $(A_2)$ is a compound of formula (III)

$H_2N$—$(R_3$—NH$)_s$—$R_4$—$NH_2$ (III)

wherein $R_3$, or each $R_3$ independently when s is greater than 1, is phenylene, mono- or di-($C_{1-4}$alkyl)phenylene, or $C_{1-4}$-alkylene,
$R_4$ has one of the significances of $R_3$ independently of $R_3$ and
s is an integer 1 to 5.

18. A printing ink according to claim 5 wherein the mol ratio of compound of formula (Ia) to compound of formula (I) is in the range 6:4 to 1:50.

19. A printing ink according to claim 6 wherein the mol ratio of compound of formula (Ia) to compound of formula (I) is in the range 1:1 to 1:20.

20. A printing ink according to claim 6 wherein the mol ratio of compounds $(A'_2):(A'_1)$ is in the range 0.85:1 to 1.2:1 and said compounds are reacted at a temperature of 100° to 200° C.

21. A printing ink according to claim 18 wherein the mol ratio of compounds $(A'_2):(A'_1)$ is in the range 0.85:1 to 1.2:1 and said compounds are reacted at a temperature of 100° to 200° C.

22. A printing ink according to claim 19 wherein the mol ratio of compounds $(A'_2):(A'_1)$ is in the range 0.85:1 to 1.2:1 and said compounds are reacted at a temperature of 100° to 200° C.

23. A printing ink according to claim 1 wherein the weight ratio (A):(B) is in the range 2:1 to 3:1.

24. A printing ink according to claim 21 wherein the weight ratio (A'):(B') is in the range 2:1 to 3:1.

25. A printing ink according to claim 22 wherein the weight ratio (A):(B) is in the range of 2.5:1 to 2.9:1.

26. A printing ink according to claim 15 wherein the colorant is a water-soluble direct dye.

27. A printing ink according to claim 19 wherein the colorant is a water-soluble direct dye.

28. A printing ink according to claim 22 wherein the colorant is a water-soluble direct dye.

29. A printing ink according to claim 24 wherein the colorant is a water-soluble direct dye and the binder is present in an amount of 1.5 to 7% by weight.

* * * * *